United States Patent [19]
Hoogenboom et al.

[11] Patent Number: 5,517,250
[45] Date of Patent: May 14, 1996

[54] ACQUISITION OF DESIRED DATA FROM A PACKETIZED DATA STREAM AND SYNCHRONIZATION THERETO

[75] Inventors: Chris Hoogenboom, Calabasas; Paul Moroney, Olivenhain, both of Calif.

[73] Assignee: General Instrument Corporation of Delaware, Chicago, Ill.

[21] Appl. No.: 392,421

[22] Filed: Feb. 28, 1995

[51] Int. Cl.$^6$ ........................................... H04N 7/12
[52] U.S. Cl. .................. 348/467; 348/466; 348/390
[58] Field of Search .................... 348/390, 466, 348/467, 461, 403, 423; H04N 7/12

[56] References Cited

U.S. PATENT DOCUMENTS

| | | | |
|---|---|---|---|
| 5,111,292 | 5/1992 | Kuriacose | 348/461 |
| 5,159,452 | 10/1992 | Kinoshita | 348/466 |
| 5,365,272 | 11/1994 | Siracusa | 348/461 |
| 5,376,969 | 12/1994 | Zdepski | 348/466 |

OTHER PUBLICATIONS

"MPEG–2/DCII Video Decompression Processor," ©Motorola Microprocessor and Memory Technologies Group, 1994, Document MC68VDP/D.

Primary Examiner—Victor R. Kostak
Attorney, Agent, or Firm—Barry R. Lipsitz; Ralph F. Hoppin

[57] ABSTRACT

A video decompression processor acquires video data for a desired service from a packetized data stream. The data stream includes transport packets carrying different components of the desired service. Each component is identified by a unique packet identifier (PID). One of the components includes a program clock reference (PCR) providing timing information for the desired service. The PIDs of the transport packets are monitored to recover video packets. Header information from the recovered packets is processed to recover packetized elementary stream (PES) packets having a PES header and picture information. Time stamp information obtained from the PES header is appended to the picture information for storage in a video memory. Picture information can subsequently be read from the memory and decoded using the appended time stamp information without having to reaccess the PES header. Various schemes for detecting, masking and recovering from transmission errors are disclosed.

16 Claims, 3 Drawing Sheets

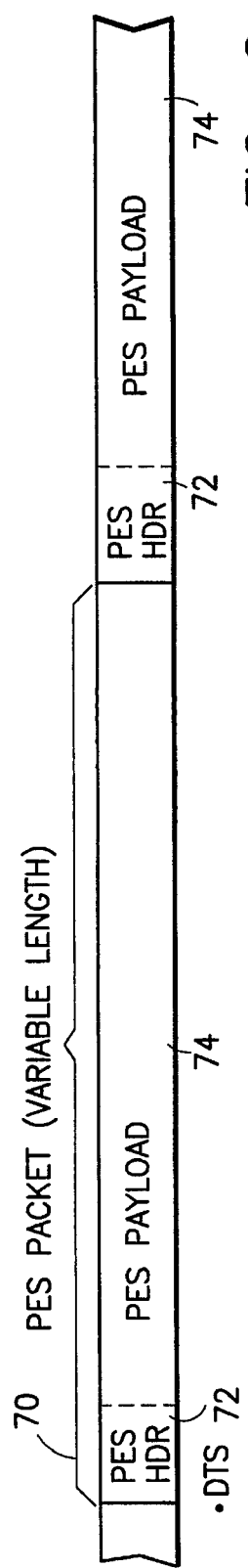
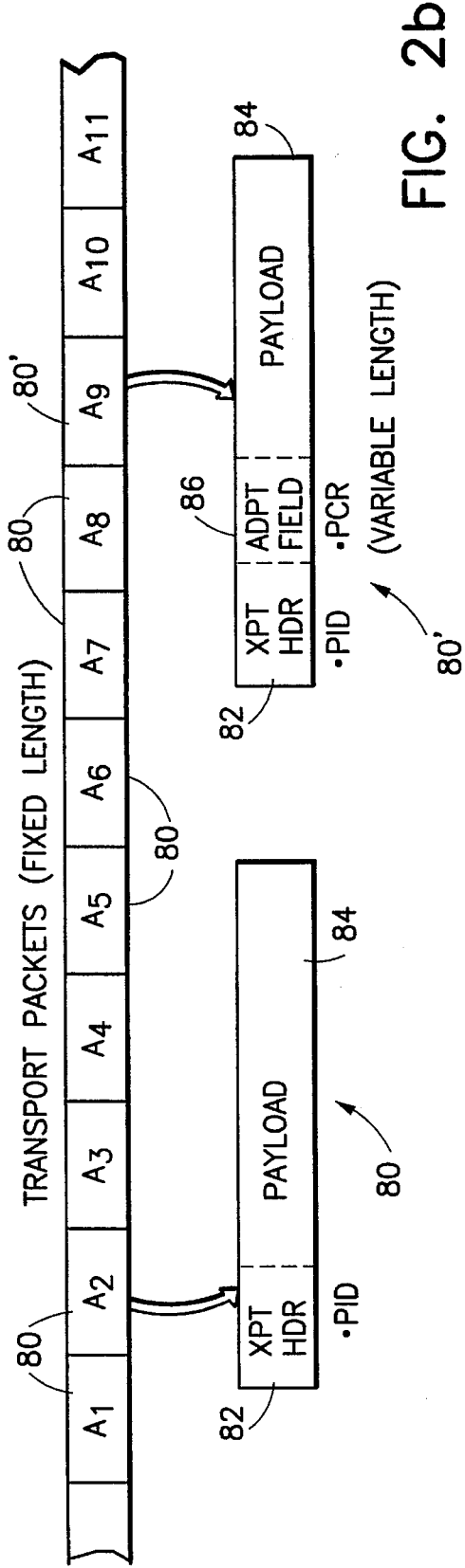
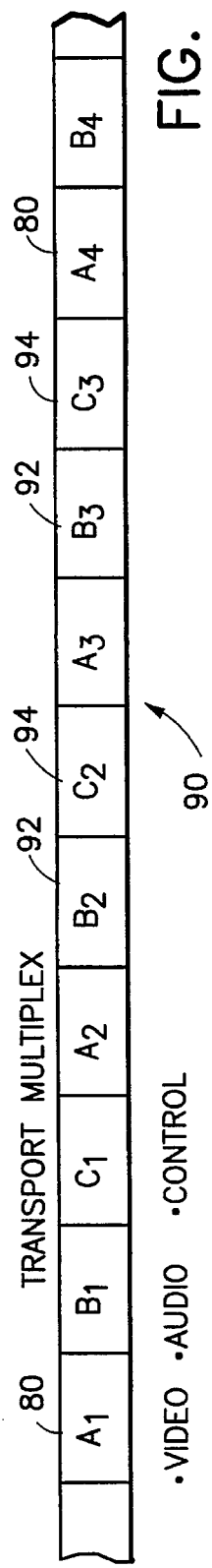

ACQUISITION OF DESIRED DATA FROM A PACKETIZED DATA STREAM AND SYNCHRONIZATION THERETO

BACKGROUND OF THE INVENTION

The present invention relates to a video decompression processor, and more particularly to an efficient scheme for acquiring desired data, such as video data to be decoded, from a packetized data stream.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. It is expected that digital television transmitter and receiver systems will replace existing analog systems just as digital compact discs have replaced analog phonograph records in the audio industry.

A substantial amount of digital data must be transmitted in any digital television system. In a digital television system, a subscriber receives the digital data stream via a receiver/descrambler that provides video, audio and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data bits referred to as "pixels." A large amount of data is required to define each video frame of a television signal. For example, 7.4 megabits of data is required to provide one video frame at NTSC (National Television System Committee) resolution. This assumes a 640 pixel by 480 line display is used with eight bits of intensity value for each of the primary colors red, green and blue. At PAL (phase alternating line) resolution, 9.7 megabits of data is required to provide one video frame. In this instance, a 704 pixel by 576 line display is used with eight bits of intensity value for each of the primary colors red, green and blue. In order to manage this amount of information, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data. In such systems, differential encoding is usually used to transmit only the difference between an actual frame and a prediction of the actual frame. The prediction is based on information derived from a previous frame of the same video sequence.

Examples of video compression systems using motion compensation can be found in Krause, et al. U.S. Pat. Nos. 5,057,916; 5,068,724; 5,091,782; 5,093,720; and 5,235,419. Generally, such motion compensation systems take advantage of a block-matching motion estimation algorithm. In this case, a motion vector is determined for each block in a current frame of an image by identifying a block in a previous frame which most closely resembles the particular current block. The entire current frame can then be reconstructed at a decoder by sending the difference between the corresponding block pairs, together with the motion vectors that are required to identify the corresponding pairs. Often, the amount of transmitted data is further reduced by compressing both the displaced block differences and the motion vector signals. Block matching motion estimating algorithms are particularly effective when combined with block-based spatial compression techniques such as the discrete cosine transform (DCT).

One way to transmit the compressed video data to a receiver is in the form of packets contained within a packetized data stream. Typically, the packets carrying the compressed video data will be multiplexed with other packets, e.g., carrying corresponding audio data and control information necessary to reconstruct a television signal. One standard for transporting digital television signals in this manner is the MPEG-2 standard, details of which can found in document AVC-491, version 1, April, 1993 published by the Telecommunications Standardization Sector, Study Group 15, Experts Group 4ATM-Video Coding of the International Organization for Standardization, ISO-IEC/JTC1/SC29/WG11 entitled "Coded Representation of Picture and Audio Information," incorporated herein by reference. Further details of the video syntax and semantics for MPEG-2 video can be found in International Organization for Standardization document ISO/IEC 13818-2 international standard, 1995, entitled "Generic Coding of Moving Pictures and Associated Audio Information: Video," also incorporated herein by reference. Also of interest, and incorporated herein by reference, is document MC68VDP/D, a preliminary data sheet entitled "MPEG-2/DCII Video Decompression Processor," ©Motorola Microprocessor and Memory Technologies Group, 1994 which describes a video decompression processor using the MPEG-2 and DigiCipher®II standards.

In the MPEG-2 system (and the similar DigiCipher® II system proprietary to General Instrument Corporation, the assignee hereof) a transport stream, or transport multiplex is made up of a contiguous set of fixed length packets. Each packet is 188 total bytes in length, with the first four of those bytes being defined as the packet header. The payload portion of each packet is thus normally 184 bytes. However, a variable length adaptation field may be provided to extend the header, when required. When an adaptation field is present, the payload portion of the packet will be correspondingly shorter.

Various timing and identification information is provided in different portions of the transport stream. These include a packet identifier (PID) found in the transport header of each transport packet to provide a reference number for identifying the transport packets carrying a specific service component. This number is included in a service definition or "service map" used by the receiver to identify those transport packets required to reconstruct a television program signal. The PID may also be referenced for various grooming and remultiplexing functions. In the case of video, audio or isochronous data, the stream of packets labeled with a single PID represents a single video, audio or isochronous data service elementary stream, respectively.

Timing information carried by the transport stream includes a program clock reference (PCR) which effectively represents a sample of the system time clock (STC) time base that underlies the service composed of the PIDs referenced in the service map. The PID carrying the packet with the PCR is also referenced in the service map. The video, audio and isochronous data components of a service are locked through a defined relationship to the system time clock. The PCR serves to define the transport rate, in the sense that between any two successive PCRs in one PID, the transport rate is constant and nominally equal to the system time clock rate times the ratio of the total number of transport bits between the PCRs divided by the difference in the PCRs in units of system time clock ticks.

The timing information carried by the transport stream also includes time stamps for the commencement of decoding and presentation of data for display. The presentation time stamp (PTS) is used for service component acquisition and also for evaluating whether timing and buffer control are operating properly at the decoder. The decoder time stamp (DTS) is used to indicate when the decoder should start to decode the first access unit (e.g., video frame) that starts somewhere in the payload of a packetized elementary stream (PES) packet whose header includes the DTS. A packetized elementary stream is a data stream composed of end-to-end PES packets which have variable length and are typically far longer than a fixed length transport packet. Thus, a PES packet is typically composed of data from a plurality of transport packets with a single PID.

The DTS is required by a video decompression processor in order to properly time the commencement of video decoding. Since the DTS is packaged in a PES header, it has been difficult and complicated for a video decompression processor at the receiver to obtain the DTS at the same time it is receiving the associated video data to be parsed. Prior to parsing, the video data is retrieved from a video memory that temporarily stores the data after having been retrieved from the transport stream. The video data will not be ready for decoding by the video decompression processor until sometime after the PES header containing the necessary DTS has been discarded.

It would be advantageous to provide a method for providing the DTS to the video decompression processor when needed without any need to reaccess the PES header which originally carried the DTS and without carrying the rest of the PES header as overhead. It would be further advantageous to provide a method for detecting a receipt of two time stamps without a full set of intervening video data to be decompressed, to enable the rapid recovery of the decoder in the event picture information is lost. It would be still further advantageous to provide a method for insuring that no data is lost when a memory map is initialized for storing the video data retrieved from the transport stream.

It would also be advantageous to provide a method for detecting the occurrence of a missing picture header in picture data carried by the transport stream, and for recovering from such missing information. Methods for selectively decoding and displaying still images from a transport stream would also be advantageous. Also desirable would be the provision of methods for muting a video output of a processor if a new image is not immediately available, or for displaying a previous picture until a new image is available.

The present invention provides methods for tracking and acquiring video data from a transport stream, and for detecting, masking and recovering from errors in the acquired stream. The methods of the present invention enjoy the aforementioned and other advantages.

SUMMARY OF THE INVENTION

In accordance with the present invention, a method is provided for acquiring video data for a desired service from a packetized data stream. The data stream includes transport packets carrying different components of the service, such as a video component, audio component and control component. The component carried by a particular transport packet is identified by a packet identifier (PID) for that component. One of the components includes a program clock reference (PCR) that provides timing information for the desired service. The method comprises the step of detecting the PCR for the desired service from the component carrying the PCR in the data stream. The recovered PCRs are used to acquire and track a decoder time clock that corresponds to the encoder timing. The PIDs of the transport packets are then monitored to recover those packets carrying a video component of the desired service. Header information from the recovered transport packets is processed to recover packetized elementary stream (PES) packets having a PES header and picture information. Time stamp information is obtained from the PES header of at least one of the PES packets. The time stamp information is buffered and then is appended to the related picture information for storage in a memory. In this manner, the picture information can be read from the memory and decoded using the time stamp information appended thereto without having to reaccess the PES header for the time stamp information.

The picture information will typically include a picture header at boundaries between successive video images to be decoded. The time stamp information obtained from the PES header can be inserted into the next picture header that follows the PES header in the packetized data stream. More specifically, the time stamp information can be inserted after a picture start code contained in the next picture header.

Time stamp information can be provided for each successive video image to be decoded. In this instance, the PES packets are monitored to detect any receipt of two PES headers having time stamps without an intervening picture start code, a condition that indicates an error has occurred. In the event that the receipt of two such PES headers without an intervening picture start code is detected, the second of the time stamps is inserted after the next picture start code while the first of the two time stamps is ignored. A control bit is associated with (e.g., appended to) the second time stamp field by the decoder to indicate to subsequent processing sections that an error has occurred.

In addition to the processing of time stamp information in an efficient manner, acquisition may require the reconfiguration of memory. In an implementation where the picture information includes pixel data and a video sequence header that provides information as to how the pixel data is to be decoded, the memory which stores the picture information can be reconfigured upon acquisition with a particular mapping in response to information from the sequence header. During the time that the memory is being reconfigured, requests for access to data stored in the memory are denied in order to ensure that no data is lost during memory map initialization.

The acquisition, selection and display of desired still pictures is also supported. More specifically, where the picture information includes picture headers at boundaries between successive video images, each picture header can include a reference number for the following video image. Specific video images can then be selected for decoding by referring to the reference number associated therewith. The selected image is then decoded and displayed as a still image, until another image with the same reference number is selected, received and displayed.

The picture information carried by the transport stream can include a sequence end code indicative of the end of a video image to be decoded by a video processor for display.

The sequence end code is detected, and a determination is made as to whether a subsequent video image is currently available for decoding and display following the sequence end code. If no such subsequent video image is available, a video output of the video processor is muted until a new video image is available. Alternatively, the output of the video processor can be provided with the last video image processed until a new video image is available.

In order to recover from lost picture headers, the picture information received from the transport stream is monitored to detect the occurrence of a missing picture header. Upon such detection, the display of the most recently displayed full frame of picture information still contained in the memory is repeated until a new full frame of video data received after a subsequent picture header is available for display.

Although not caused by an error, skipped pictures (i.e., pictures which are skipped at the encoder) are handled in a similar manner. In order to recover from skipped pictures, the memory can be monitored to detect whether the data for a full video frame is present in the memory when the decoding of that frame is to commence. Upon detecting that the full video frame is not present, the display of the most recently displayed full frame of decoded picture information still contained in the memory is repeated.

Recovery from stale time stamp information is also provided. In particular, once the decoding process is started in response to a valid DTS, the decoder continues to decode the incoming frames one at a time. Between DTS's, the frames are decoded at times implied from the past decode times. When a new DTS is received, the time designated by that DTS is compared to the value of the decoder time clock at the decode time. If the time designated by the DTS precedes the value of the decoder time clock (i.e., the DTS time has already passed), it is assumed that synchronization has slipped and that the video decompression processor (VDP) is behind in the decoding process. Thus, the picture information associated with that time stamp information is discarded and the VDP will not decode that picture.

BRIEF DESCRIPTION OF THE DRAWINGS

FIGS. 2a to 2c are diagrammatic illustrations showing how variable length PES packets are reorganized into fixed length transport packets for use in providing a transport multiplex for transmission.

DETAILED DESCRIPTION OF THE INVENTION

Figure 1:
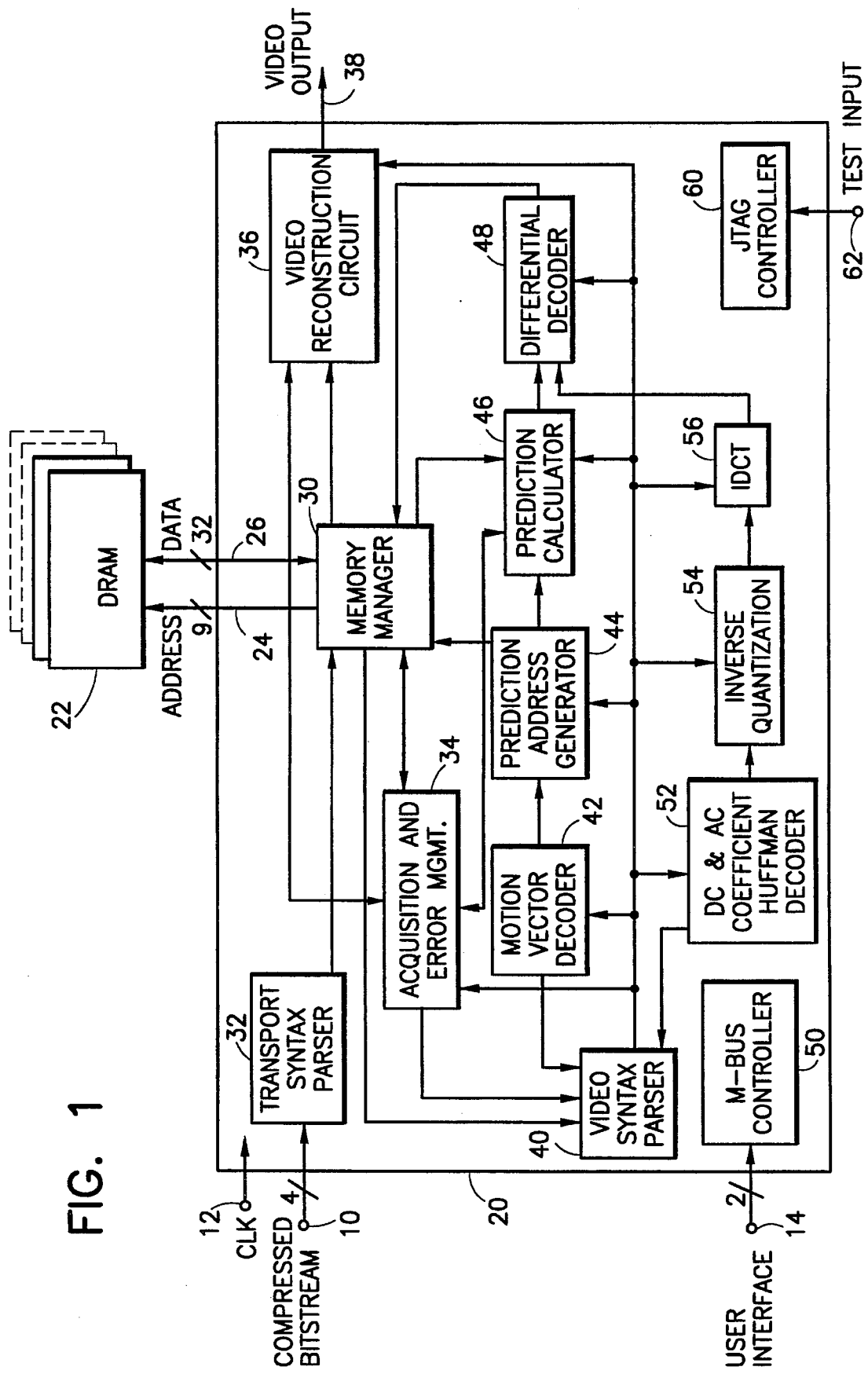
FIG. 1 is a block diagram of a video decompression processor of the type that can utilize the methods of the present invention.

FIG. 1 is a block diagram of a video decompression processor incorporating a memory manager 30 that addresses an external DRAM 22 to store and retrieve video data necessary to reconstruct a television program at a receiver. The processor, generally designated 20, is a pipelined processor designed to decode both the transport layer (i.e., control and other non-video information) and the video layer of the compressed bitstream input via terminal 10, sometimes referred to as the "transport packet interface" of the video processor.

A user processor interface is provided at terminal 14 for control of the video data processor via an M-bus controller 50 that configures various registers in processor 20. The M-bus is a two-wire, bidirectional serial bus which provides a simple and efficient means of data exchange between devices, and is fully compatible with the I²C bus standard.

An interface to the DRAM 22 is provided via address lines 24 and data lines 26. In the example illustrated in FIG. 1, DRAM 22 has a nine bit address port and a thirty-two bit data port.

A video output interface 38 is provided for the decompressed, reconstructed video which may, for example, be output as a standard CCIR (International Radio Consultive Committee) 656, eight bit, twenty-seventy MHz multiplexed luminance (Y) and chrominance (Cr, Cb) signal.

A test interface can be provided via terminal 62 to a conventional JTAG (Joint Test Action Group) controller 60. JTAG is a standardized boundary scan methodology used for board-level testing to detect faults in package and board connections, as well as internal circuitry.

The video decompression processor 20 receives a clock signal via terminal 12. The clock provides timing information that is used, e.g., to enable a transport syntax parser 32 to recover timing information and video information from transport packets contained in a packetized data stream input via terminal 10. An acquisition and error management circuit 34 utilizes a program clock reference (PCR) and decode time stamp (DTS) detected by a video syntax parser 40 to synchronize the start of picture decoding. This circuit sets vertical synchronization and provides global synchronization for all video decode and display functions.

The video layer is buffered in an input buffer (FIFO) configured in the external DRAM 22 by memory manager 30. The video syntax parser 40 receivers the compressed video data output from the DRAM FIFO via memory manager 30, and separates the motion vector information from the coefficients describing the video information. The coefficients are processed by a Huffman decoder 52, inverse quantizer 54, and inverse discrete cosine transform (IDCT) processor 56.

Motion vectors are recovered and used to address previously decoded video frames required for reconstructing a current video frame. In particular, a motion vector decoder 42 decodes the motion vectors received from video syntax parser 40 and passes them to a prediction address generator 44. The prediction address generator provides address information necessary to retrieve, via memory manager 30, the necessary anchor frame (i.e., intraframe (I) or prediction (P) frame) data to enable prediction calculator 46 to provide a prediction signal necessary to reconstruct a current frame block. Differential decoder 48 combines the prediction data with the decoded coefficient data to provide decompressed video data. The decompressed data is stored in appropriate buffers of DRAM 22 via memory manager 30. It should be appreciated that the video decompression processes carried out by motion vector decoder 42, prediction address generator 44, prediction calculator 46, differential decoder 48, Huffman decoder 52, inverse quantizer 54 and IDCT 56 are generally conventional and well understood by those skilled in the art.

Memory manager 30 schedules all activity on the external DRAM address and data buses 24, 26 and efficiently addresses DRAM 22. The memory manager insures that the data transfer requirements of the input FIFO portion of DRAM 22, the video syntax parser 40 and the video reconstruction circuit 36 (as well as prediction calculator 46 and differential decoder 48) are all met. The video reconstruction circuit 36 builds a current picture and inserts closed captions, a vertical interval test signal (VITS) and/or test pattern data for output on video output line 38. The decode process for a compressed frame of video data is synchronized by comparing the time specified by the decoder time clock to a decode time stamp (DTS), which indicates when the video frame is to be decoded. The display process for the decompressed frame is synchronized by comparing the time specified by the decoder time clock to a presentation time stamp (PTS), which indicates when the video frame is to be presented for display.

The memory manager also provides a variable size for the FIFO portion of DRAM 22 depending on the decoding mode, which can be, for example, NTSC or PAL with or without bidirectional prediction frames (B-frames). The video buffer control ensures that the FIFO provided by DRAM 22 does not overflow or underflow. Buffer control is a function of system timing parameters including the PCR and DTS.

DRAM 22 is illustrated as an external memory and may be provided by a plurality of DRAM chips, such as two, four Mbit (megabit, i.e., $2^{20}$ bits) DRAMs for an eight Mbit implementation or four, four Mbit DRAMs for a sixteen Mbit implementation. It should be appreciated that in future implementations, and as memory technology advances, DRAM 22 may be provided as internal memory within the video decompression processor. The DRAM is mapped to provide various decode and output video buffers as well as a circular FIFO buffer for the compressed input video bitstream. The DRAM may also be used to provide a test pattern buffer, a VITS buffer and a closed captioning display reordering buffer as well as to store various picture structure data necessary to properly display the decoded video frames. The DRAM can be reinitialized via memory manager 30 to provide different memory maps as required when variables are modified such as PAL or NTSC video, eight or sixteen Mbit memory configuration, and whether B-frames are present.

As indicated above, the memory manager 30 schedules all of the activity on the external DRAM buses including the data transfer requirements of the input FIFO, the video parser and the video reconstruction circuit. The memory manager also performs the required DRAM refresh in a conventional manner. For example, the same row in each of two or four external DRAMs can be refreshed simultaneously.

When a packetized bitstream containing compressed video data is input to terminal 10 of video decompression processor 20, video frames represented by the compressed data are reconstructed one at a time. Initially, a full frame of video data will have to be received and stored in DRAM 22. Information for subsequent video frames can comprise a subset of the full video frame which, when added to prediction data from the prior video frame (stored in DRAM 22) will result in the reconstruction of a full frame.

FIG. 2a illustrates a portion of a packetized elementary stream carrying successive PES packets, each having a header (PES-HDR) 72 and a PES payload 74. The PES packets 70 are of variable length.

PES packets are typically several thousand bytes in length. They are required to be aligned in such a manner that, when divided into transport packet payloads, the first byte of every PES header is located in the first payload position of some transport packet. For any transport packet carrying the aligned PES header, a "payload unit start indicator" will be set in the transport header for the transport packet. In the MPEG-2 and DigiCipher® II systems, the PES format is used for all service components that are inherently synchronous. More particularly, video, audio and isochronous data components are carried as packetized elementary streams, and the PES headers 72 will carry various information necessary to define the payload, including a packet start code prefix, a stream identification, and a PES packet length. The header may also contain a presentation time stamp (PTS) or both a PTS and a decode time stamp (DTS). When the header only carries a PTS, the DTS is inferred to be the same as the PTS. The PTS is a field which indicates the value that corresponding bytes of the decoder system time clock reference should have when the first presentation unit (i.e., video frame, audio sync frame, isochronous data access unit) whose access unit starts somewhere in the payload of this PES packet is presented. For video, an access unit starts if the first byte of the picture start code is present in the payload of the PES packet. For audio, an access unit starts if the first byte of the audio sync word is present in the payload of this PES packet. For isochronous data, an access unit starts with the first byte of the PES packet payload. The PTS field is used for service component acquisition, and also for evaluating whether timing and buffer control are operating properly at the decoder.

The DTS is a field indicating what value corresponding bits of the reconstructed decoder time clock reference should have when the decoder starts to decode the first access unit that starts somewhere in the payload of this PES packet. The PTS and DTS differ only for video, and only in the case of the I-frame and the P-frames transmitted with B-frames.

The PES payload contains the information data that is desired to be transmitted to a receiver. Thus, for example, the payloads together include all of the video or audio information necessary for the receiver to decode and reconstruct a digital television signal.

In order to meet the requirements of robustness and simplicity, a fixed packet length approach is preferred to the variable length PES packets. Thus, as illustrated in FIG. 2b, the packetized elementary stream containing the PES packets 70 is formatted into a stream of fixed length transport packets 80. The transport packets illustrated in FIG. 2b all correspond to the same service component, such as the video component of a digital television transmission. In the MPEG-2 and DigiCipher® II embodiments, each packet is 188 total bytes in length, with the first four bytes comprising a transport packet header (XPT HDR) 82. The payload portion 84 of each packet 80 is thus normally 184 bytes. However, an adaptation field mechanism is present, as illustrated by transport packet 80', to extend the header when required. The adaptation field 86 provides additional information which is not required for every transport packet. The adaptation field (ADPT FIELD) 86 extends the regular transport header 82 at the expense of payload 84, which will be less than 184 bytes whenever the adaptation is provided. The adaptation field 86 is of variable length, depending on the information it contains. Typically, the adaptation field will support additional information for time base recovery and other functions, and also provides a mechanism for padding the payload when it does not occupy the full 184 bytes. Such padding can be used, for example, to make the variable length video PES packet fit into a fixed number of transport packets.

As indicated in FIG. 2b, the transport header of each transport packet includes the PID which identifies the particular service component carried by the transport packet. The PCR will be carried by an adaptation field to provide timing information for a desired service. At a receiver, the PCRs for the desired service are detected from the adaptation fields. Transport packets of a specific PID will then be monitored to recover a particular component of the service being processed. Since the video decompression processor of FIG. 1 processes video information, it will monitor the transport packets to locate all of those with the PID indicative of the video component being processed. The processing of the video component is explained in further detail below in connection with FIG. 3.

Transport packets from various service components are multiplexed into a transport multiplex 90 as illustrated in FIG. 2c. The transport multiplex will carry interspersed packets from each of the different components (e.g, video, audio and control) necessary to reconstruct a service at the receiver. In the illustrative transport multiplex shown in FIG. 2c, video transport packets 80 ($A_1, A_2, A_3 \ldots$) are followed by audio transport packets 92 ($B_1, B_2, B_3 \ldots$) which, in turn, are followed by other component packets 94 ($C_1, C_2, C_3 \ldots$), which can be other services or data carried by the transport packet stream.

Figure 3:
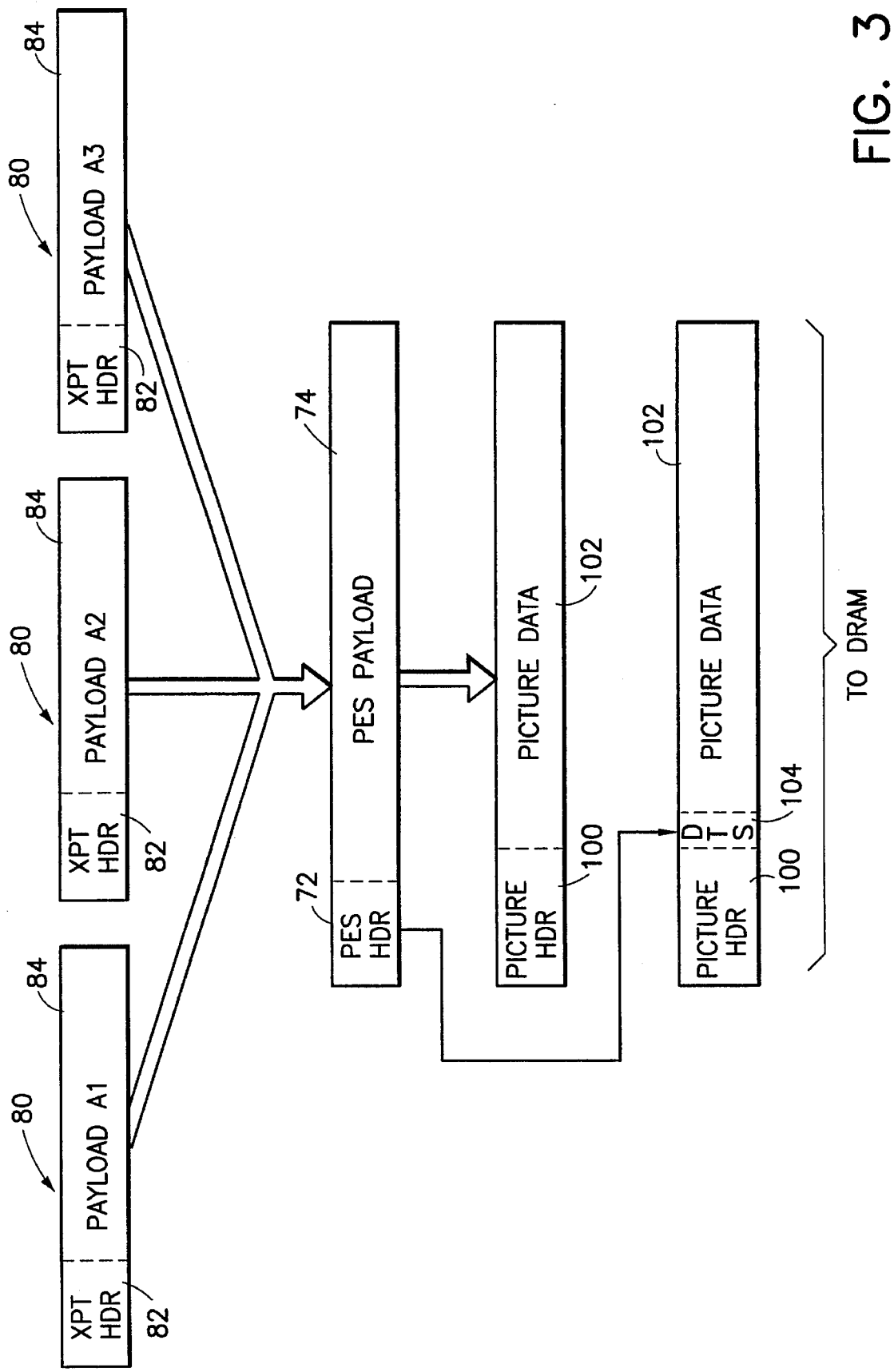
FIG. 3 is a diagrammatic illustration showing how the received transport packets are processed at a decoder to recover picture information and time stamp information for storage in the dynamic random access memory (DRAM) of FIG. 1.

FIG. 3 illustrates the processing of video transport packets by a video decompression processor, such as that illustrated in FIG. 1. A plurality of transport packets 80 are received by the transport syntax parser 32, which strips the payload information that is necessary from successive transport packets to reconstruct a PES payload 74. The information in the transport headers 82 is used to identify the payload information 84 and enables the reconstruction of the PES payload data 74 as well as the PES header 72. As indicated above, the PES packets are aligned such that when they are divided into transport payloads, the first byte of every PES header is located in the first payload position of some transport packet. Upon detecting a payload unit start indicator in the transport header, the transport syntax parser will know that the first portion of the payload in that transport packet will contain the PES header.

One of the items contained in the PES header 72 (or inferred from a PTS in the PES header) is the decode time stamp (DTS) 104 which is required by the video syntax parser 40 in order to properly decode the picture data. Thus, in accordance with the present invention, the DTS is extracted from the PES header 72 and reinserted following the picture header 100 in the video information (picture data) 102 stored in the FIFO portion of DRAM 22. The insertion of the DTS in the video information stored in DRAM 22 enables the decompression processor to process the video information without having to retrieve the DTS from a source outside the DRAM. It should be noted that the PTS is also stored in DRAM 22 if it differs from the DTS.

A special feature of the present invention is that in the special case where a DTS is detected and then a second DTS is detected without ever having written the previous one to the DRAM 22, a unique code is provided to advise the video syntax parser 40 that this situation has occurred. More particularly, the video syntax parser will be advised that a packet was lost with a picture header but that the second DTS received is probably correct for the next picture. The parser, detecting the lost picture header, would otherwise throw out the DTS associated with the next picture. Upon receiving the unique code identifying the situation, however, the video syntax parser 40 will know that the current DTS overwrote the previous unused DTS, and the current DTS will be assumed to be valid.

While the video component of the transport stream is being acquired as previously described, the video syntax parser 40 will continually request data from the memory manager 30. Since the rate at which data is written by the packet interface is much slower than the rate at which it can be parsed, the FIFO within DRAM 22 is emptied almost immediately after the packet interface has written a word to it. The syntax parser then parses the data for information it needs in a sequence header in order to initialize a memory map in DRAM 22. The sequence header is part of the video syntax carried in the PES payload and indicates that a new sequence of video information (pictures) follows. The sequence header identifies parameters of the picture or of the video coding that was used (e.g., horizontal size, vertical size, sample aspect ratio, frame rate, bit rate, and intraframe/ non intraframe quantization, etc.) so that DRAM 22 can be properly mapped to store the data for decompression of the compressed video. Upon detecting a sequence extension appended to the sequence header, the memory map is initialized. The sequence extension provides additional information such as whether the video has been scanned in an interlaced or progressive manner. During initialization of the memory map, all requests for access to DRAM 22 are denied. Once the memory map is initialized, access to DRAM is enabled. This procedure insures that no data stored in the FIFO portion of DRAM 22 is lost when the memory map is initialized. The video syntax parser 40 can then proceed to look for the first picture header with a valid DTS in order to commence decompression of the video data.

In any digital communication scheme, it is expected that data will occasionally be lost over the transmission channel. When video data is communicated to a video decompression processor, it is possible that a picture header will be lost. It is also possible that in processing the received video data, the FIFO portion of DRAM 22 will overflow or underflow. In these instances, error management must be practiced to minimize the likelihood that noticeable artifacts will be seen on a television viewer's screen. Skipped pictures must also be dealt with. Although skipped pictures do not result from errors introduced by the transmission channel, they are managed in the same way as such errors.

In the MPEG-2 and DigiCipher® II standards, the fundamental video unit is a macroblock. A macroblock is a group of 16×16 video pixels. Video is coded hierarchically. A sequence is any video sequence. A sequence is made up of groups-of-pictures. A group-of-pictures is made up of individual pictures. Each picture corresponds to a single frame of motion video. A picture is broken into slices. Each slice, in turn, is composed of macroblocks. Macroblocks are composed of six 8×8 blocks of pixels, including 16×16 luminance pixels and two blocks of 8×8 chrominance pixels. A block is a term used to describe any 8×8 block of pixels.

In order to detect a missing picture header, the video syntax parser 40 of the decompression processor illustrated in FIG. 1 monitors the vertical position of each picture slice. If slice_vertical_position$_n$< slice_vertical positionn$_{n-1}$ and no picture header occurred between slice_vertical_position$_n$ and slice_vertical_position$_{n-1}$, it is assumed that slice_vertical_position$_n$ belongs to a new picture and that a picture header has been lost. If the parser detects a missing picture header, it will search for and acquire on the next picture header and ignore its DTS if it has one, unless it has been informed that the current DTS is an overwritten DTS that is assumed to be valid. If there is no DTS, the video syntax parser will predict one based on previous timing information. If the prediction is wrong due to an error, then the system will remain out of sync for a short time until the next valid DTS arrives. The count of pictures in the FIFO portion of DRAM 22 will remain correct since neither the packet interface nor the video syntax parser will have counted the picture with the lost picture header.

Whenever a picture is lost, the display of a prior picture will be repeated. More specifically, the most recently displayed full frame that is available in DRAM 22 will be repeated. Typically, this will be the most recently displayed I or P frame. The most recent B-frame cannot be repeated unless DRAM 22 is large enough to hold a full B-frame, which may be wasteful and is therefore not the preferred embodiment.

The transport syntax parser 32 will detect the presence of complete pictures in the FIFO portion of DRAM 22 by monitoring the occurrence of picture start codes and sequence end codes. If the decoder, upon examining the number of pictures in the FIFO, determines that at the start of decode time there is not an entire picture in the FIFO, then it is assumed that a skipped picture has occurred at the encoder.

If a skipped picture is detected, the DTS associated with the incomplete picture currently in the FIFO is ignored since it is defined to be invalid. The video processor will predict a DTS and continue to examine the state of the FIFO. When an entire picture is in the FIFO, decoding will recommence. While waiting for an entire picture to arrive in the FIFO, the most recently displayed picture will be repeated.

If a DTS is detected that is in the past, i.e., prior to the current time designated by the reconstructed decoder time clock, it is assumed that synchronization has somehow slipped and the decoding process has gotten behind. If this occurs, the picture data associated with the "stale" DTS will not be decoded and the data will be discarded. If the next picture has no DTS, it will be decoded, on the assumption that the synchronization slip was less than or equal to one picture. If the next picture does have a DTS, the DTS needs to be checked to see if it is in the past, in which case it is discarded. If the DTS is not in the past, the associated picture will be decoded when the DTS is current.

In the event of a FIFO overflow, packets will be discarded and the first thing written to the FIFO after the overflow has ceased will be a sequence error code. The decoding process will treat this event the same as any other packet error, and apply video holds to the data in the discarded packets attempting to conceal the error. An underflow will be treated the same as a skipped picture, as described above.

Still images are supported in either a high rate or a low rate mode. The high rate still image mode is initiated by a user who sets, e.g., a catalog shopping byte in the video processor via user interface 14 (FIG. 1). Once the processor is in this mode, it will decode and display only those pictures whose temporal reference matches the temporal reference in a page number register. The user processor must select which page (i.e., still image) will be decoded and displayed by setting this register.

Low rate still image mode uses the MPEG-2 skipped pictures behavior of the video processor to display a low picture rate source, analogous to a slide show. After acquisition, every time the video processor finds that there is an entire picture in its FIFO, this picture will be decoded and displayed until the next entire picture is in the buffer.

The video processor can be implemented to mute the video output after a sequence end code if a new picture does not immediately follow. Muting the video output of video reconstruction circuit 36 will result in the user's television screen going black. As an alternative to muting the video output until a new picture is received, the last picture of the sequence can be repeated until the next picture is received.

The alternative of muting the video output is advantageous for allowing the local insertion of commercials at a cable television headend or the like.

It should now be appreciated that the present invention provides improved methods for the tracking and acquisition of video data from a packetized data stream and for detecting, masking and recovering from errors in such data. Timing information extracted from a PES header is stored together with picture information in a video memory to facilitate the decoding of the picture information. Various techniques are provided for masking and recovering from transmission errors.

Although the invention has been described in connection with various specific embodiments, those skilled in the art will appreciate that various modifications and adaptations may be made thereto without departing from the spirit and scope of the invention as set forth in the claims.

What is claimed is:

1. A method for acquiring video data for a desired service from a packetized data stream that includes transport packets carrying different components of said service, the component carried by a particular transport packet being identified by a packet identifier (PID) for that component, comprising the steps of:

receiving the packetized data stream from a transmission source;

monitoring the PIDs of the transport packets to recover those carrying a video component of said service;

processing header information from the recovered transport packets to recover packetized elementary stream (PES) packets having a PES header and picture information;

obtaining time stamp information from the PES header of at least one of said PES packets;

appending said time stamp information to said picture information; and storing said time stamp information and said picture information together in a memory;

wherein said picture information can be read from said memory and decoded using the time stamp information appended thereto without having to reaccess said PES header for said time stamp information.

2. A method in accordance with claim 1 wherein:

said picture information includes picture headers at boundaries between successive video images to be decoded; and said time stamp information obtained from said PES header is inserted into the next picture header that follows the PES header in said packetized data stream.

3. A method in accordance with claim 2 wherein said time stamp information is inserted after a picture start code contained in said next picture header.

4. A method in accordance with claim 3 comprising the further steps of:

monitoring said PES packets to detect a receipt of two PES packet headers having time stamps without an intervening picture start code; and in the event such a receipt of two PES packet headers having time stamps without an intervening picture start code is detected, inserting the time stamp from the second of said two PES packet headers after the next picture start code while ignoring the time stamp from the first of said two PES packet headers.

5. A method in accordance with claim 4 comprising the further steps of:

providing a code indicative of the receipt of two PES packet headers having time stamps without an intervening picture start code; and using said code to inhibit the time stamp from the second of said two PES packet headers from being ignored as invalid.

6. A method in accordance with claim 1 wherein said picture information includes pixel data and a video sequence header that provides information as to how said pixel data is to be decoded, said method comprising the further steps of:

configuring said memory with a particular mapping in response to information from said sequence header; and denying requests for read or write access to said memory while the memory is being configured.

7. A method in accordance with claim 2 comprising the further steps of:

monitoring said picture information to detect the occurrence of a missing picture header; and upon such detection, repeating the display of the most recently displayed full frame of picture information still contained in said memory until a new full frame after a subsequent picture header is available for display.

8. A method in accordance with claim 1 wherein one of said components includes a program clock reference (PCR) providing timing information for said desired service, comprising the further steps of:

detecting the PCR for said desired service from the component carrying the PCR in said data stream;

comparing said time stamp information to the value of a decoder time clock synchronized with said PCR to determine if a time represented by the time stamp information precedes the value of the decoder time clock, and if so, discarding the picture information associated with that time stamp information.

9. A method in accordance with claim 1 wherein said picture information includes picture headers at boundaries between successive video images, each picture header including a reference number for the following video image, said method comprising the further steps of:

enabling specific video images to be selected for decoding by referring to the reference number associated therewith; and decoding the selected image and displaying it as a still image until a subsequent selected image of the same reference number is ready to be displayed.

10. A method for acquiring video data for a desired service from a packetized data stream that includes transport packets carrying different components of said service, the component carried by a particular transport packet being identified by a packet identifier (PID) for that component, comprising the steps of:

receiving the packetized data stream from a transmission source;

monitoring the PIDs of the transport packets to recover those carrying a video component of said service;

processing header information from the recovered transport packets to recover packetized elementary stream (PES) packets having a PES header and picture information, said picture information including pixel data and a video sequence header that provides information as to how said pixel data is to be decoded;

configuring a memory for storage of said picture information with a particular mapping in response to information from said sequence header; and denying requests for read or write access to said memory while the memory is being configured.

11. A method for processing video data for a desired service from a packetized data stream that includes transport packets carrying different components of said service, the component carried by a particular transport packet being identified by a packet identifier (PID) for that component, comprising the steps of:

receiving the packetized data stream from a transmission source;

monitoring the PIDs of the transport packets to recover those carrying a video component of said service;

processing header information from the recovered transport packets to recover packetized elementary stream (PES) packets having a PES header and picture information, said picture information including picture headers at boundaries between successive video images to be decoded;

monitoring said picture information to detect the occurrence of a missing picture header; and upon such detection, repeating the display of the most recently displayed full frame of picture information still contained in said memory until a new full frame after a subsequent picture header is available for display;

wherein said full frames of picture information comprise adjacent slices of pixel data that are decoded one slice at a time, and said missing picture header is detected by the steps of:

determining if the position of a received slice of picture information within a picture information frame precedes the position of the preceding slice received, and if so;

determining whether a picture header exists between said preceding slice and said received slice, and if not;

declaring an instance of a missed picture header.

12. A method for selectively displaying still video images selected from a stream of successive video images comprising the steps of:

receiving the stream of successive video images from a transmission source;

providing a picture header at the boundary between each successive video image in said stream, each picture header including a reference identification for the following video image;

selecting a specific video image to be decoded by referring to the reference identification associated therewith; and decoding the selected image for display as a still image until a subsequent selected image having the same reference identification is ready to be displayed.

13. The method of claim 11 comprising the further steps of:

obtaining time stamp information from the PES header of at least one of said PES packets;

appending said time stamp information to said picture information; and storing said time stamp information and said picture information together in a memory;

wherein said picture information can be read from said memory and decoded using the time stamp information appended thereto without having to reaccess said PES header for said time stamp information.

14. The method of claim 13 wherein said picture information includes pixel data and a video sequence header that provides information as to how said pixel data is to be decoded, said method comprising the further steps of:

configuring said memory with a particular mapping in response to information from said sequence header; and denying requests for access to data stored in said memory while the memory is being configured.

15. The method of claim 10 comprising the further steps of:

obtaining time stamp information from the PES header of at least one of said PES packets;

appending said time stamp information to said picture information; and storing said time stamp information and said picture information together in a memory;

wherein said picture information can be read from said memory and decoded using the time stamp information appended thereto without having to reaccess said PES header for said time stamp information.

16. The method of claim 5 wherein said picture information includes pixel data and a video sequence header that provides information as to how said pixel data is to be decoded, said method comprising the further steps of:

configuring said memory with a particular mapping in response to information from said sequence header; and denying requests for access to data stored in said memory while the memory is being configured.

* * * * *